J. BECKER.
AMMONIA AND TAR RECOVERY PROCESS.
APPLICATION FILED AUG. 22, 1919.
1,375,484.
Patented Apr. 19, 1921.
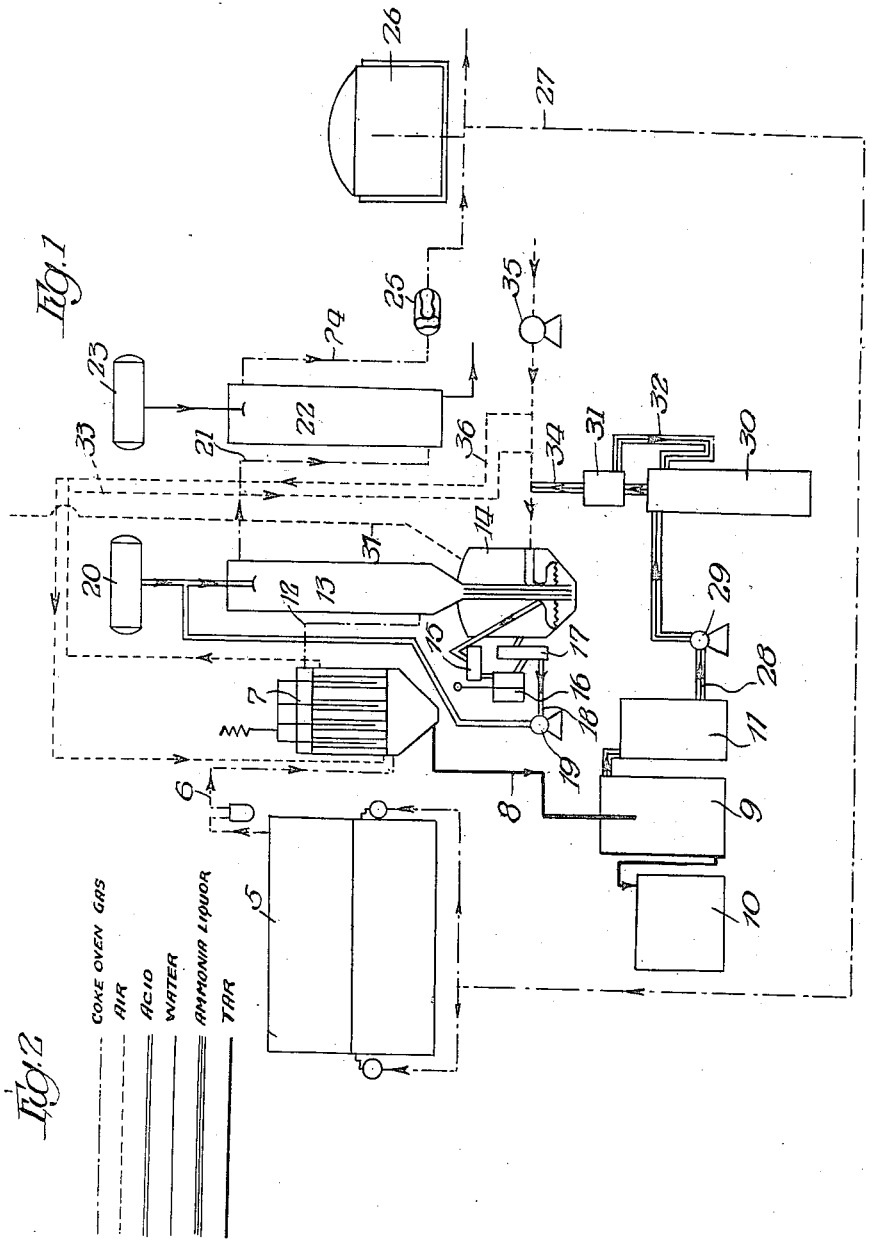

UNITED STATES PATENT OFFICE.

JOSEPH BECKER, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

AMMONIA AND TAR RECOVERY PROCESS.

1,375,484.          Specification of Letters Patent.       Patented Apr. 19, 1921.

Application filed August 22, 1919. Serial No. 319,254.

*To all whom it may concern:*

Be it known that I, JOSEPH BECKER, a citizen of the United States, residing in Pittsburgh, in the county of Allegheny and State of Pennsylvania, have invented a new and useful Improvement in Ammonia and Tar Recovery Processes, of which the following is a specification.

This invention relates primarily to the recovery of tar and ammonia from coke-oven gas, and has for an object a simplified and efficient extraction of the tar and also a recovery of the ammonia by a method that simplifies apparatus and economizes the heat required in the ammonia recovery; the invention may also be applied to the treatment of gas that is otherwise derived from the carbonization of coal, and may also have such other objects and results as are found to obtain in the processes hereinafter set forth and claimed.

In the accompanying drawings:

Figure 1 is a conventional diagram illustrating an embodiment of the invention in a preferred arrangement of apparatus for practising its processes.

Fig. 2 is a key to the symbols employed in the various lines that show the connections between the apparatus indicated in Fig. 1.

Referring to the drawing, there is indicated at 5 the coke-ovens from which the coke-oven gas is derived. The evolved gas from the carbonization of the coal in the coke-ovens flows through a gas-line 6 into an electrical precipitator 7, which it enters at a temperature of about 80° C. In the electrical precipitator 7, the gas is cooled to a temperature a little below the dew point of the gas, *e. g.*, to a temperature of about 75° C., by means of atmospheric air which enters said electrical precipitator at about 25° C. As the coke-oven gas enters the electrical precipitator at a temperature of about 80° C., the tar is carried in the gas in the form of a finely comminuted mist, and such mist is effectively precipitated in the electrical precipitator. Concurrently with the precipitation of the tar in the electrical precipitator 7, water is precipitated because of the fact that the gas is cooled to a temperature of a few degrees below its dew point; during the condensation of this water, ammonia from the gas, including ammonium chlorids and other fixed-ammonia compounds is absorbed. The tar and condensate of fixed-ammonia compounds and water flows from the electrical precipitator 7, through a tar and fixed-ammonia line 8, to a separating tank 9 in which the tar is separated from the fixed-ammonia liquor, the tar being discharged into a tar tank 10 and the fixed-ammonia into a fixed-ammonia liquor tank 11.

The coke-oven gas leaves the electrical precipitator 7 with its temperature reduced to about 75° C., and with its volume somewhat reduced from the aforesaid cooling, and passes through a gas-line 12 to the hot acid-washer tower 13 in which the ammonia is absorbed by the acid-solution that is kept hot by the absorption reaction. The gas enters the acid-washer at a temperature that is about the water saturation point; and practically no water is taken up by the gas from the acid-solution, and consequently there is no precipitation of ammonium sulfate in the acid-washer tower.

The acid-solution from the aforesaid acid-washer tower 13 flows into a saturator 14, in which deposition of the ammonium sulfate is effected, as will hereinafter appear. The acid-solution drained from the saturator's drain-table 15 and centrifugal drier 16 into the mother-liquor tank 17, passes from said mother-liquor tank into the return acid-line 18, through which it is forced by an acid pump 19 to the top of the acid-washer tower 13, a proportion of fresh acid being there continuously added from the acid-tank 20.

From the acid-washer tower, the gas flows through the gas-line 21 into and through the cooler 22, which is sprayed with fresh water from the water tank 23. The drain from this cooler flows to the naphthalene recovery apparatus. The tar and ammonia-freed gas issues from the cooler 22 greatly reduced in volume at a temperature of about 30° C., and is substantially dehydrated. Such gas passes next through the gas-line 24 through which it is forwarded by the exhauster 25 to the gas-holder 26, and thence to whatever use it may be employed in. For example, a portion of the gas from the gas-holder 26 may be forwarded to the supply-line 27, back to the coke-ovens 5, and there utilized for coking the charges of coal in said ovens.

The fixed-ammonia liquor passes from the aforesaid tank 11 to a fixed-ammonia liquor line 28, through which it is forwarded by a pump 29 to the fixed-ammonia still 30, in which dissociation of the ammonia from the liquor is effected. The ammonia vapors from the still pass through a dephlegmator 31 in which water carried along with the ammonia vapor is condensed and returned through the reflux-line 32.

The air passes out of the electrical precipitator 7, in which it is superheated a little, and flows through the air-line 33 to the ammonia-saturator 14. Before the air reaches said saturator 14, however, it is mixed with the ammonia vapor discharging through the ammonia vapor line 34 from the dephlegmator 31. Consequently, the air enters the saturator 14 carrying with it the ammonia vapor derived from the dissociation of the fixed-ammonia in the still 30. Because of the super-heat in the air derived from the heat interchange between the coke-oven gas and air in the electrical precipitator 7, the air is capable of absorbing all the water brought into the ammonia saturator 14 by the ammonia-charged acid solution from the acid-washer 13, and thus effects in said saturator 14 the deposition of ammonium sulfate, not only from the ammonia-charged acid solution but also from the ammonia from the still that is carried in the saturator along with the super-heated air. The air is drawn in from the outside atmosphere by an air fan 35, which forwards it through an air-line 36 to the aforesaid electrical precipitator 7; the water-laden air from the saturator 14 discharges through an exhaust line 37.

By first cooling the gas in the electrical tar precipitator 7, then causing the gas to pass through the acid-washer 13, and finally through the water-sprayed cooler 22, the volume of gas to be handled is greatly reduced and the exhauster can thus be made of comparatively small dimensions. Furthermore, the gas encounters little resistance in the acid-washer as compared with the resistance the gas would encounter if passed through the saturator. Furthermore, no fixed-ammonia is conducted into the saturator but is separately distilled, thereby eliminating corrosion of the lead work in the apparatus. Another advantage in the process of the present invention lies in the fact that primary coolers and gas re-heaters and a free-ammonia still are eliminated, with a resultant great simplification in the apparatus.

The process of the invention may be practised in various ways other than the particular embodiment that has been described for purposes of illustration, and still be within the scope and subject matter of the claims hereinafter made.

What is claimed is:

1. In a process for the recovery of tar and ammonia from coke-oven gas, the combination of steps that consists in: concurrently extracting the tar from the coke-oven gas, and cooling the gas by passing it in counter-current with air; passing such cooled gas through an acid-wash to absorb the ammonia of the gas; discharging the mother-liquor from such acid-wash into a saturation-bath; and passing the heated air from the tar-extraction operation through said saturation-bath, to effect deposition of the ammonium sulfate; substantially as specified.

2. In a process for the recovery of tar and ammonia from coke-oven gas, the combination of steps that consists in: concurrently extracting the tar from the coke-oven gas, and cooling the gas by passing it in counter-current with air at atmospheric temperature, whereby the air is heated; passing the cooled gas through an acid-wash to absorb the ammonia of the gas; discharging the mother-liquor from such acid-wash into a saturation-bath; and passing the heated air from the tar-extraction operation through said saturation-bath, to effect deposition of the ammonium sulfate; substantially as specified.

3. In a process for the recovery of tar and ammonia from coke-oven gas, the combination of steps that consists in: extracting the tar from the coke-oven gas; cooling said gas by passing it in counter-current with atmospheric air, whereby the air is heated; then passing the cooled gas through an acid-wash to absorb the ammonia of the gas; discharging the mother-liquor from such acid-wash into a saturation-bath; and passing the air heated by the gas through said saturation-bath, to effect deposition of the ammonium sulfate; substantially as specified.

4. In a process for the recovery of tar and ammonia from coke-oven gas, the combination of steps that consists in: extracting the tar from the coke-oven gas, and cooling said gas below its saturation point to effect condensation of water vapor and the solution therein of fixed-ammonia compounds from the ammonia of the gas; separating the tar from the fixed-ammonia compounds; passing the cooled gas through an acid-wash to absorb the residue of ammonia of the gas; discharging the mother-liquor from such acid-wash into a saturation-bath; distilling the fixed-ammonia compounds to liberate the ammonia-vapor; and passing preheated air and the ammonia vapor through the said saturation-bath, to effect deposition of the ammonium sulfate from the mother-liquor and the distillate ammonia vapor; substantially as specified.

5. In a process for the recovery of tar and ammonia from coke-oven gas, the combination of steps that consists in: extracting the tar from the coke-oven gas, and cooling said gas below its saturation point to effect condensation of water vapor and the solution therein of fixed-ammonia compounds from the ammonia of the gas; separating the tar from the fixed-ammonia compounds; passing the cooled gas through an acid-wash to absorb the residue of ammonia of the gas; discharging the mother-liquor from such acid-wash into a saturation-bath; distilling the fixed-ammonia compounds to liberate the ammonia-vapor; and passing preheated air through the said saturation-bath, to effect deposition of the ammonium sulfate from the mother-liquor; substantially as specified.

6. In a process for the recovery of tar and ammonia from coke-oven gas, the combination of steps that consists in: electrically precipitating the tar from the coke-oven gas, and cooling said gas below its saturation point to effect condensation of water vapor and the solution therein of fixed-ammonia compounds from the ammonia of the gas; separating the tar from the fixed-ammonia compounds; passing the cooled gas through an acid-wash to absorb the residue of ammonia of the gas; discharging the mother-liquor from such acid-wash into a saturation-bath; distilling the fixed-ammonia compounds to liberate the ammonia-vapor, and passing preheated air through the said saturation-bath, to effect deposition of the ammonium sulfate from the mother-liquor; substantially as specified.

7. In a process for the recovery of tar and ammonia from ammonia-charged gas, the combination of steps that consists in: concurrently extracting the tar from such gas and cooling it by passing it in counter-current with air, whereby the air is heated; passing such cooled gas through an acid-wash to absorb the ammonia of the gas; discharging the mother-liquor from such acid-wash into a saturation-bath; and passing the heated air from the tar extraction operation through said saturation-bath, to effect deposition of the ammonium sulfate; substantially as specified.

8. In a process for the recovery of tar and ammonia from ammonia-charged gas, the combination of steps that consists in: concurrently extracting the tar from such gas, and cooling it by passing it in counter-current with air, at atmospheric temperature, whereby the air is heated; passing such cooled gas through an acid-wash to absorb the ammonia of the gas; discharging the mother-liquor from said acid-wash into a saturation-bath; and passing the heated air from the tar extraction operation through said saturation-bath, to effect deposition of the ammonium sulfate; substantially as specified.

9. In a process for the recovery of tar and ammonia from ammonia-charged gas, the combination of steps that consists in: extracting the tar from the gas, and cooling said gas below its saturation point to effect condensation of water vapor and the solution therein of fixed-ammonia compounds from the ammonia of the gas; separating the tar from the fixed-ammonia compounds; passing the cooled gas through an acid-wash to absorb the residue of ammonia of the gas; discharging the mother-liquor from such acid-wash into a saturation-bath; distilling the fixed-ammonia compounds to liberate the ammonia-vapor; and passing preheated air and the ammonia vapor through the said saturation-bath, to effect deposition of the ammonium sulfate from the mother-liquor and the distillate ammonia vapor; substantially as specified.

10. In a process for the recovery of tar and ammonia from ammonia-charged gas, the combination of steps that consists in: extracting the tar from the gas, and cooling said gas below its saturation point to effect condensation of water vapor and the solution therein of fixed-ammonia compounds from the ammonia of the gas; separating the tar from the fixed-ammonia compounds; passing the cooled gas through an acid-wash to absorb the residue of ammonia of the gas; discharging the mother-liquor from such acid-wash into a saturation-bath; distilling the fixed-ammonia compounds to liberate the ammonia-vapor; and passing preheated air through the said saturation-bath, to effect deposition of the ammonium sulfate from the mother-liquor; substantially as specified.

11. In a process for the recovery of tar and ammonia from coke-oven gas, the combination of steps that consists in: extracting the tar from the coke-oven gas; cooling such gas below its saturation-point to effect the condensation of ammonia-liquor; separating the tar from such condensate; passing the cooled gas through an acid wash to absorb the residue of ammonia of the gas; discharging the mother-liquor from such acid-wash into a saturation-bath; distilling the ammonia-liquor condensate to liberate the ammonia-vapor; and passing preheated air and the distillate ammonia-vapor through the said saturation-bath, to effect deposition of the ammonium-sulfate from the mother-liquor and the distillate ammonia-vapor; substantially as specified.

12. In a process for the recovery of ammonia from ammonia-charged gas, the combination of steps that consists in: subjecting such gas to a primary cooling operation by passing it in counter-current with air, at atmospheric temperature, whereby the air is heated; passing such cooled gas through an acid-wash to absorb the ammonia of the gas; discharging the mother-liquor from such acid-wash into a saturation-bath; and passing the heated air from the primary cooling operation through said saturation-bath, to effect deposition of the ammonium sulfate; substantially as specified.

13. In a process for the recovery of ammonia from ammonia-charged gas, the combination of steps that consists in: subjecting such gas to a primary cooling operation by passing it in counter-current with air; passing such cooled gas through an acid-wash to absorb the ammonia of the gas; discharging the mother-liquor from such acid-wash into a saturation-bath; and passing air through said saturation-bath to effect deposition of ammonium sulfate; substantially as specified.

In testimony whereof I have hereunto set my hand this 15th day of August, 1919.

JOSEPH BECKER.